US009184874B2

(12) United States Patent
Ratnakar et al.

(10) Patent No.: US 9,184,874 B2
(45) Date of Patent: Nov. 10, 2015

(54) STORING LOG LIKELIHOOD RATIOS IN INTERLEAVED FORM TO REDUCE HARDWARE MEMORY

(75) Inventors: Niranjan Ratnakar, Hillsborough, NJ (US); Jingyuan Liu, Morris Plains, NJ (US); Charles Stanski, Belvidere, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 847 days.

(21) Appl. No.: 12/412,868

(22) Filed: Mar. 27, 2009

(65) Prior Publication Data

US 2009/0245426 A1    Oct. 1, 2009

Related U.S. Application Data

(60) Provisional application No. 61/041,212, filed on Mar. 31, 2008.

(51) Int. Cl.
*H04L 27/06* (2006.01)
*H04L 1/00* (2006.01)
*H04L 1/18* (2006.01)

(52) U.S. Cl.
CPC ............ *H04L 1/0045* (2013.01); *H04L 1/0071* (2013.01); *H04L 1/1845* (2013.01)

(58) Field of Classification Search
CPC .... H04L 1/0045; H04L 1/0071; H04L 1/1845
USPC .................................................. 375/340, 327
See application file for complete search history.

(56) References Cited

U.S. PATENT DOCUMENTS

| 7,154,936 | B2 | 12/2006 | Bjerke et al. | |
|---|---|---|---|---|
| 7,225,382 | B2* | 5/2007 | Ramech et al. | 714/748 |
| 7,594,160 | B2* | 9/2009 | Cho et al. | 714/780 |
| 2001/0056560 | A1* | 12/2001 | Khan et al. | 714/746 |
| 2003/0012310 | A1 | 1/2003 | Nagayasu | |
| 2003/0103584 | A1* | 6/2003 | Bjerke et al. | 375/340 |
| 2004/0081259 | A1* | 4/2004 | Ammer et al. | 375/340 |
| 2005/0113087 | A1* | 5/2005 | Rick et al. | 455/434 |
| 2006/0133533 | A1 | 6/2006 | Khandekar et al. | |

(Continued)

FOREIGN PATENT DOCUMENTS

CN    101124764 A    2/2008
EA       006093 B1    8/2005

(Continued)

OTHER PUBLICATIONS (IPEA-409) International Preliminary Report on Patentability Chapter II, PCT/US2009/038712, Sep. 30, 2010.*

(Continued)

*Primary Examiner* — Shuwang Liu
*Assistant Examiner* — Nader Bolourchi
(74) *Attorney, Agent, or Firm* — Stanton Braden (57) ABSTRACT

An apparatus and method for storing log likelihood ratios in an interleaved form comprising receiving a plurality of interleaved codewords; obtaining at least one log likelihood ratio (LLR) for the plurality of interleaved codewords; storing the at least one LLR in a memory; deinterleaving the plurality of interleaved codewords after the at least one LLR has been stored in the memory; and performing a bit decision of the deinterleaved codewords using the stored at least one LLR.

34 Claims, 8 Drawing Sheets

(56) References Cited

U.S. PATENT DOCUMENTS

| | | | |
|---|---|---|---|
| 2006/0259849 A1 | 11/2006 | Conway et al. | |
| 2007/0002977 A1* | 1/2007 | Cho et al. | 375/340 |
| 2007/0165558 A1 | 7/2007 | Jong et al. | |
| 2008/0065944 A1* | 3/2008 | Seol et al. | 714/748 |
| 2008/0072115 A1* | 3/2008 | Cho et al. | 714/751 |

FOREIGN PATENT DOCUMENTS

| | | |
|---|---|---|
| EP | 1858187 A1 | 11/2007 |
| JP | 2002185437 A | 6/2002 |
| JP | 2002527939 | 8/2002 |
| JP | 2004040587 A | 2/2004 |
| JP | 2007509511 | 4/2007 |
| JP | 2007512772 | 5/2007 |
| JP | 2007195169 A | 8/2007 |
| JP | 2007536845 A | 12/2007 |
| JP | 4741495 | 5/2011 |
| RU | 2316900 | 2/2008 |
| WO | 0021236 A1 | 4/2000 |
| WO | WO-03049397 | 6/2003 |
| WO | 2005055640 | 6/2005 |
| WO | WO2005071913 A1 | 8/2005 |
| WO | 2006069270 A1 | 6/2006 |

OTHER PUBLICATIONS

Written Opinion of the International Search Authority, PCT/US2009/038712, Sep. 30, 2010.*

Boutillon E et al: "Iterative Decoding of Concatenated Convolutional Codes: Implementation Issues" Proceedings of the IEEE, IEEE. New York, US, vol. 95, No. 6, Jun. 1, 2007, pp. 1201-1227, XP011189320 ISSN: 0018-9219 p. 1203; figure 3 p. 1206, right-hand column—p. 1217 p. 1221, right-hand column, paragraph VII—p. 1222, left-hand column.

International Preliminary Report on Patentability—PCT/US2009/038712, International Search Authority—European Patent Office—Apr. 6, 2010.

International Search Report and the Written Opinion—PCT/US2009/038712 International Search Authority—European Patent Office—Aug. 28, 2009.

Taiwan Search Report—TW098110716—TIPO—Jan. 4, 2013.

* cited by examiner

STORING LOG LIKELIHOOD RATIOS IN INTERLEAVED FORM TO REDUCE HARDWARE MEMORY

CLAIM OF PRIORITY UNDER 35 U.S.C. §119

The present Application for Patent claims priority to Provisional Application No. 61/041,212 entitled "Storing LLRs in Interleaved Form to Reduce Hardware Memory" filed Mar. 31, 2008, and assigned to the assignee hereof and hereby expressly incorporated by reference herein.

FIELD

This disclosure relates generally to apparatus and methods for decoding in a wireless communication system. More particularly, the disclosure relates to storing log likelihood ratio (LLR) information in interleaved form.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals (e.g., a mobile station), and the reverse link (or uplink) refers to the communication link from the terminals to the base stations. This communication link may be established via a single input-single output (SISO), multiple input-single output (MISO) or a multiple-input-multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. For example, a MIMO system can support time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Wireless communication systems are subject to various channel perturbations and noise disturbances which are introduced somewhere in the wireless link. These imperfections result in errors in the data processed by a receiver. In general, there are two broad categories of error control applicable to wireless communication systems, error detection and error correction. Error detection techniques, such as automatic repeat request (ARQ), typically add a few redundant bits to a transmit data frame for the purpose of error detection. If an error is detected, the receiver typically sends back an error detection message to the transmitter to request a retransmission of the same transmit data frame. In contrast, error correction techniques, such as forward error correction (FEC), typically add more redundant bits in a structured manner to a transmit data frame for the purpose of error correction. Error correction allows the receiver to both detect and correct received errors, without feedback and retransmission. Depending on the channel error characteristics and throughput versus latency requirements on the system, error detection or error correction might be preferred.

SUMMARY

Disclosed is an apparatus and method for storing log likelihood ratio (LLR) information in interleaved form. Advantages of the present disclosure include reducing memory requirement. According to one aspect, a method for storing log likelihood ratios in an interleaved form comprising receiving a plurality of interleaved codewords; obtaining at least one log likelihood ratio (LLR) for the plurality of interleaved codewords; storing the at least one LLR in a memory; deinterleaving the plurality of interleaved codewords after the at least one LLR has been stored in the memory; and performing a bit decision of the deinterleaved codewords using the stored at least one LLR.

According to another aspect, a receiver for storing log likelihood ratios (LLRs) in an interleaved form comprising an antenna for receiving a plurality of interleaved codewords; a demodulator for obtaining at least one log likelihood ratio (LLR) for the plurality of interleaved codewords; a memory for storing the at least one LLR; a deinterleaver for deinterleaving the plurality of interleaved codewords after the at least one LLR has been stored in the memory; and a decoder for performing a bit decision of the deinterleaved codewords using the stored at least one LLR.

According to another aspect, an apparatus for storing log likelihood ratios (LLRs) in an interleaved form comprising means for receiving a plurality of interleaved codewords; means for obtaining at least one log likelihood ratio (LLR) for the plurality of interleaved codewords; means for storing the at least one LLR; means for deinterleaving the plurality of interleaved codewords after the at least one LLR has been stored; and means for performing a bit decision of the deinterleaved codewords using the stored at least one LLR.

According to another aspect, a computer-readable medium including program code stored thereon, comprising program code for receiving a plurality of interleaved codewords; program code for obtaining at least one log likelihood ratio (LLR) for the plurality of interleaved codewords; program code for storing the at least one LLR; program code for deinterleaving the plurality of interleaved codewords after the at least one LLR has been stored; and program code for performing a bit decision of the deinterleaved codewords using the stored at least one LLR.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The terms "systems" and "networks" are often used interchangeably. A CDMA system may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Cdma2000 is described in documents from an organization named "3rd Generation Partnership Project 2" (3GPP2). These various radio technologies and standards are known in the art.

Additionally, single carrier frequency division multiple access (SC-FDMA), which utilizes single carrier modulation and frequency domain equalization is another wireless communication technique. A SC-FDMA system can have similar performance and the same overall complexity as those of an OFDMA system. SC-FDMA signal has lower peak-to-average power ratio (PAPR) because of its inherent single carrier structure. SC-FDMA has drawn great attention, especially in uplink communications where lower PAPR greatly benefits the mobile terminal in terms of transmit power efficiency. Using SC-FDMA technique is currently a working assumption for uplink multiple access scheme in 3GPP Long Term Evolution (LTE), or Evolved UTRA. All of the above wireless communication techniques and standards may be used with the data centric multiplexing algorithms described herein.

Figure 1:
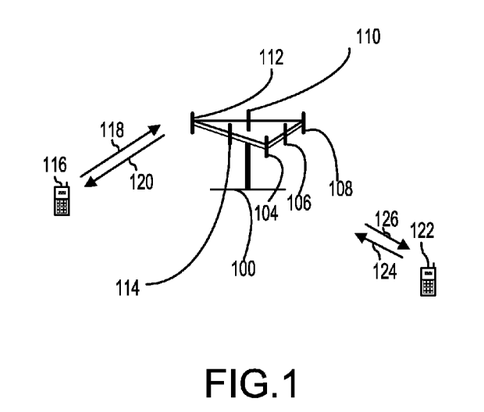
FIG. 1 is a block diagram illustrating an example of a multiple access wireless communication system.

FIG. 1 is a block diagram illustrating an example of a multiple access wireless communication system. As illustrated in FIG. 1, an access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118. Each group of antennas and/or the area in which they are designed to communicate is often referred to as a sector of the access point. In one example, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals. An access point may be a fixed station. An access point may also be referred to as an access node, a base station, node B or some other similar terminology known in the art. An access terminal may also be called a mobile station, a user equipment (UE), a wireless communication device or some other similar terminology known in the art.

Figure 2:
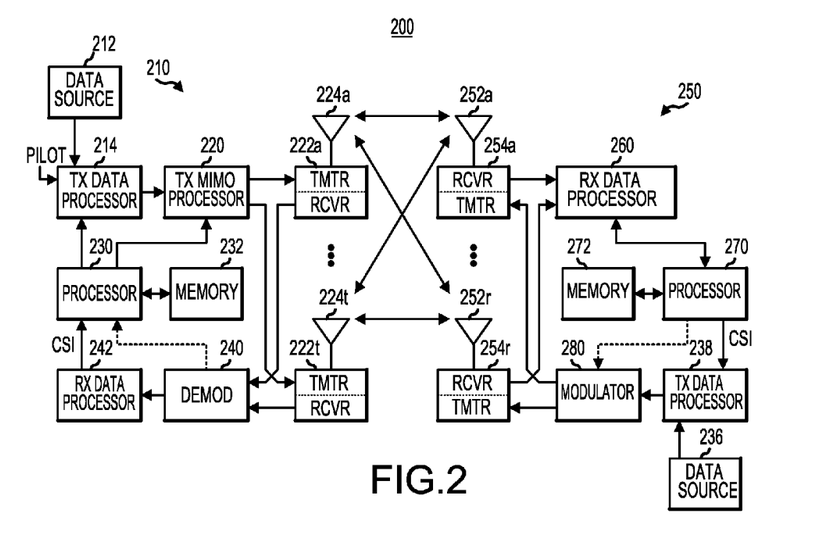
FIG. 2 is a block diagram illustrating an example of a wireless MIMO communication system.

FIG. 2 is a block diagram illustrating an example of a wireless MIMO communication system. FIG. 2 shows a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214. In one example, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In one example, the TX MIMO processor 220 applies beamforming weights to the symbols of the data streams and to the antenna from which the symbol is being transmitted. Each transmitter 222a, . . . or, 222t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252a through 252r is provided to a respective receiver (RCVR) 254a through 254r. Each receiver 254a through 254r conditions (e.g., filters, amplifies, and downconverts) a respective received signal, digitizes the conditioned signal to provide samples, and further processes the samples to provide a corresponding "received" symbol stream.

A RX data processor 260 then receives and processes the $N_R$ received symbol streams from $N_R$ receivers 254a through 254r based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224a through 224t, conditioned by receivers 222a through 222t, demodulated by a demodulator 240, and processed by a RX data processor 242 to extract the reserve link message transmitted by the receiver system 250. Processor 230 then determines which pre-coding matrix to use for determining the beamforming weights, then the processor 230 processes the extracted message. One skilled in the art would understand that the transceivers 222a through 222t are called transmitters in the forward link and receivers in the reverse link. Similarly, one skilled in the art would understand that the transceivers 254a through 254r are called receivers in the forward link and transmitters in the reverse link.

As stated above, depending on the channel error characteristics and throughput versus latency requirements on the system, error detection or error correction might be preferred. Hybrid ARQ (HARQ) is a third error control category which combines features of both error detection and error correction in an attempt to attain the benefits of both techniques. In one example of HARQ, the first transmission of a transmit data frame may contain only error detection bits. If the receiver determines that the data frame is received without error, the message is acknowledged and no retransmission is requested. However, if the receiver determines that the data frame is received in error, using the error detection bits, then an error detection message is sent back to the transmitter, which sends a second transmission of the transmit data frame along with additional error correction bits. Then, if the receiver determines that the data frame is again received in error, beyond the capability of the additional error correction bits, another error detection message is sent back to the transmitter, which sends a third transmission of the transmit data frame along with a separate set of error correction bits. In general, HARQ retransmissions may be repeated for the same transmit data frame until it is received without error or up to a predetermined maximum number of retransmissions, whichever occurs first.

In one example, in a Ultra Mobile Broadband (UMB) system for the Forward Link Data Channel (FLDCH), the incoming Media Access Control (MAC) packets are first split into subpackets, whose length is less than or equal to, for example, 4 kbits. Then the subpackets are fed into a turbo/convolutional forward error correction (FEC) encoder to be encoded, interleaved and repeated. The output bit stream for each subpacket, called the codeword, could be, for example, 5 times longer than the subpacket, due to the forward error correction overhead. The codeword is then transmitted across multiple HARQ transmissions with repetition if necessary. The HARQ transmissions are in general separated by a length of time. For instance, in HARQ8, the codeword is transmitted once every 8 frames. For each transmitted frame, only partial bits of the entire codeword are transmitted. In the conventional design, the entire encoded codeword is stored in memory. The total memory required will be at least 5 times the sum of length of all incoming MAC packets. For example in the forward link of UMB, assuming worst case numbers (i.e. highest packet format for all the tiles (128)) 4 layers and an HARQ interlace depth of 8 frames, the conventional design requires around 25 Mbit on-chip memory.

Figure 3:
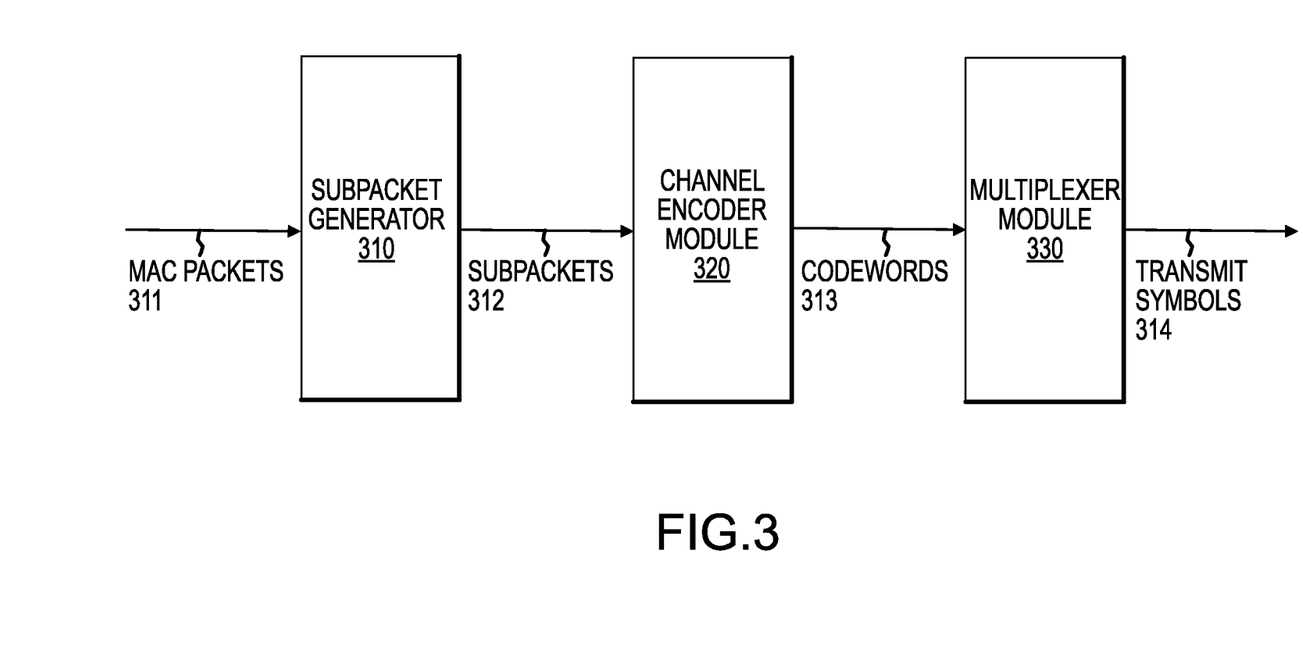
FIG. 3 is a block diagram illustrating an example of a transmit data processor for HARQ encoding.

FIG. 3 is a block diagram illustrating an example of a transmit data processor for HARQ encoding. The transmit data processor 300 assembles and encrypts MAC packets 311. Subpacket generator 310 accepts MAC packets 311 at its input and converts them into subpackets 312 that are less than, for example, 4 kbits in length. Channel encoder module 320 accepts the subpackets 312 and produces codewords 313 as outputs. Multiplexer module 330 accepts the codewords 313 as inputs and produces transmit symbols 314 with a particular resource assignment within a particular HARQ transmission. In one aspect, the transmit data processor 300 provides a subpacket interleaving table and maintains a HARQ history along with the multiplexer module 330.

Figure 4:
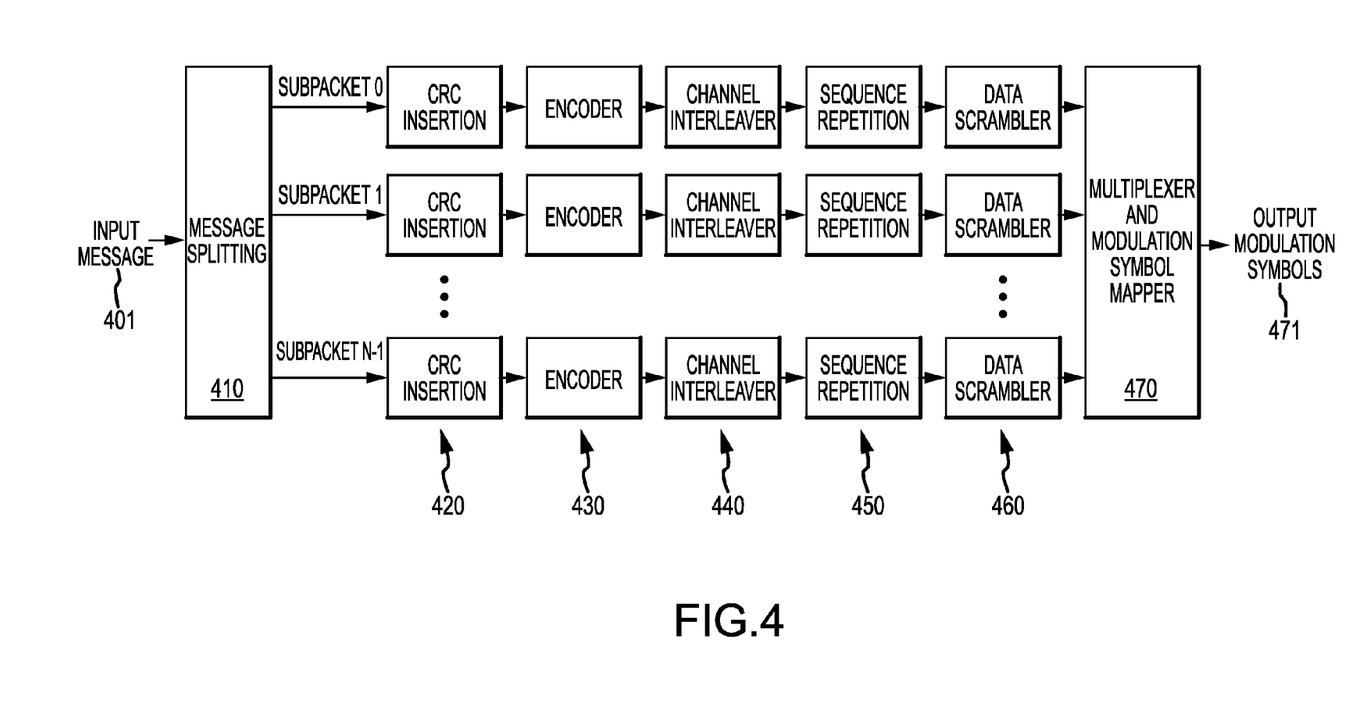
FIG. 4 is a block diagram illustrating a more detailed example of a transmit data processor for HARQ encoding.

FIG. 4 is a block diagram illustrating a more detailed example of a transmit data processor for HARQ encoding. An input message 401 is received and split into a plurality of subpackets by a message splitter 410. In one aspect, subpacket lengths are limited to no greater than 4096 bits each. Each subpacket is then sent to a cyclic redundancy check (CRC) insertion module 420 where error detection bits are produced and appended to each subpacket. In one aspect, the error detection bits are computed as a 24 bit CRC code. Next, encoder 430 produces encoded subpackets for error correction. In one aspect, the encoder 430 is a turbo encoder. In another aspect, the encoder 430 is a convolutional encoder. Next, channel interleaver 440 interleaves (i.e., shuffles) the encoded subpackets to provide resiliency against burst errors. The sequence repetition module 450 and data scrambler 460 perform additional signal processing on the interleaved encoded subpackets. Finally, multiplexer and modulation symbol mapper 470 combine the scrambled subpackets and supplies output modulation symbols 471.

Figure 5:
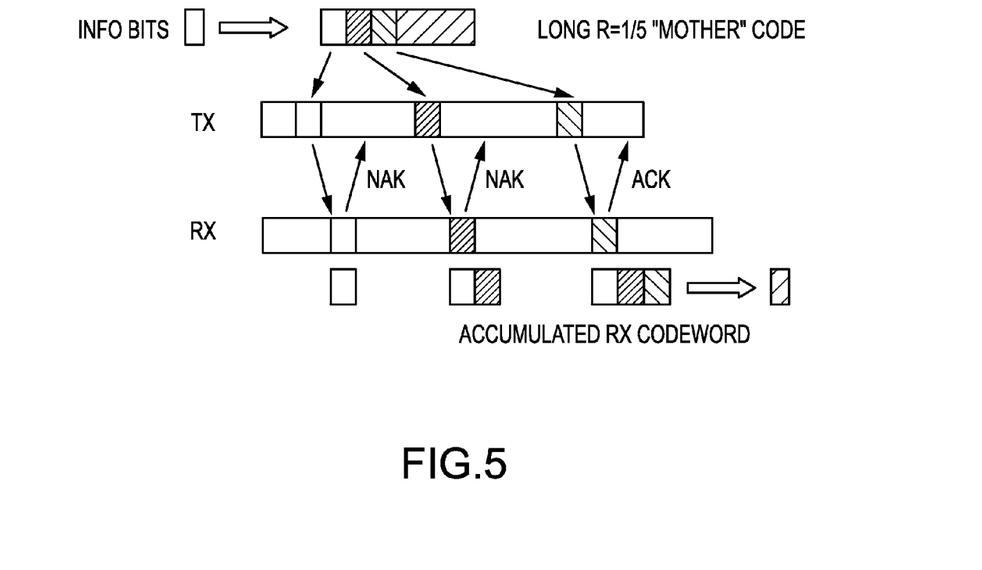
FIG. 5 illustrates an example of a hybrid ARQ operation.

FIG. 5 illustrates an example of a hybrid ARQ operation. In one example, the codeword is comprised of a long mother code with code rate R=⅕. In one aspect, the transmitter incrementally sends parity bits for error detection and/or error correction in each transmission. In one example for UMB, up to six transmissions may be sent. Repetition is used when the number of transmitted bits exceeds the mother codeword block length. In one aspect, the channel encoder module 320 does not store the entire mother code across transmissions. Instead the channel encoder module 320 saves the channel encoder module input across transmissions and runs the channel encoder module 320 for each transmission by maintaining the history state across transmissions.

In one aspect, in the presence of Hybrid ARQ, a codeword is not always transmitted in its entirety after being interleaved. At the receiver, a likelihood ratio (LR) is computed for each received codeword after demodulation to perform bit decisions. A likelihood ratio (LR) is the ratio of the maximum probability of a result under two different hypotheses. It is used as a statistical test to decide between two different hypotheses based on this ratio. In one example, a likelihood ratio (LR) is computed by a soft-decision receiver as the ratio of the a posteriori probability for a bit of one output state, for example one, to the a posteriori probability for a bit of another output state, for example, zero. A log likelihood ratio (LLR) is defined as the logarithm of the likelihood ratio (LR) and is utilized for computational convenience. For example, multiplication and division in the computation of a likelihood ratio (LR) is converted into addition and subtraction in the computation of a log likelihood ratio (LLR).

In a receiver, the LLRs for the codeword bits not yet transmitted are assumed to be zeros. These zeros are padded to the LLRs corresponding to the codeword bits transmitted and then deinterleaved. However, the zeros earlier padded are spread out throughout the codeword after deinterleaving. Further, if the interleaved LLRs are saved in the memory, this would require zeroing out the LLR values for the locations corresponding to bits not yet transmitted. During soft combining, the LLRs received have to be added to the previously received LLR values. If the codeword is stored in the interleaved form, this would require fetching data out of order and, after soft combining, writing out of order into the hardware memory. Prior to deinterleaving, the zeros that are padded are in contiguous location. By storing the LLRs before deinterleaving, the average hardware memory requirement is saved by storing only the LLRs already received and automatically assuming that the rest are zeros. Also, this removes the need of zeroing out the locations corresponding to these LLRs. Since the LLRs are stored prior to deinterleaving, during soft combining, the memory fetching is reduced and the memory addressing is simplified.

In one aspect, the size of the codeword has a large range (e.g., from 128 bits to 20 k bits) and has a variable life span due to HARQ (e.g., from 1 physical frame to 48 physical frames). Thus, sizing the LLR memory to the worst case can be prohibitive. Using a link list and allocating memory dynamically allows for optimizing the memory utilization. Assume that the LLR memory is partitioned into nodes, each of which can be allocated and de-allocated independently. These nodes are of equal size and their size is programmable. These nodes are initially placed in a so-called free nodes link list. Each codeword is associated with a unique link list, in which nodes are allocated on a need basis from the free nodes link list. Such a dynamic allocation allows for allocating memory, only when required, thus optimizing the memory utilization. At the end of the codeword's life span (for example, due to user termination or successful decoding) the nodes allocated in the link list are returned to the free nodes link list.

In an Ultra Mobile Broadband (UMB) system, data is communicated in the physical layer, via packets. Each packet potentially contains more than one subpacket. Each subpacket is a codeword that is encoded and interleaved at the transmitter and has to be deinterleaved and decoded at the receiver. A codeword is a sequence of bits of length n. At the receiver, each bit from the encoded sequence corresponds to a log likelihood ratio (LLR). In one example, a LLR has a 6 bit value. These codewords are typically transmitted over multiple physical frames (e.g., to utilize hybrid ARQ). Typically a codeword is not transmitted in its entirety in any of these transmissions and only a portion of it is transmitted in any HARQ transmission. These LLR values have to be stored in memory until, for instance, user termination or successful decoding.

At the transmitter, the encoded codeword is interleaved. Interleaved sequence chunks are transmitted in successive HARQ transmissions. A portion of the interleaved sequence is transmitted. Corresponding to each bit in this transmitted portion, the receiver computes a LLR value. The LLR value corresponding to bits which have not yet been transmitted is set to the value zero. In UMB, if a codeword is fully transmitted and there is a transmission opportunity, then the interleaved codeword is retransmitted from the beginning. The LLR computation for these retransmitted bits involves reading the LLR value from memory, adding the computed LLR for the current transmission and storing this value.

Prior to the decoding process, these LLRs are mapped appropriately to the codeword transmitted. This operation essentially reverses the interleaving operation and is known as deinterleaving.

Storing LLRs after deinterleaving (as is conventionally done) has the following drawbacks:
1) The zeros that are padded to the LLRs corresponding to the codeword bits not yet transmitted are spread out throughout the codeword.
2) This requires zeroing out the LLR values for the memory allocated to the codeword at initialization.
3) Writing the LLR values into memory requires writing out of order since the received LLR values are spread out over the entire codeword.
4) During a read modify write (RMW) operation, the LLRs received have to be added to the previously received LLR values. This requires fetching data out of order and, after soft combining, writing out of order into the hardware memory.

Storing the LLR values prior to deinterleaving and moving the deinterleaver into the decoder overcome the drawbacks mentioned above for the following reasons:

1) The zeros that are padded are padded below the LLRs corresponding to the received bits and are contiguous. Thus, the zero padding operation can be done in the deinterleaver by passing on the length of the received LLRs as a parameter. By storing the LLRs before deinterleaving, there are savings to the average hardware memory by storing only the LLRs already received and automatically assuming that the rest are zeros.
2) As a result, there is no need to zero out the LLR values at initialization.
3) In the interleaved codeword, the LLRs values calculated are for contiguous bits and so writing is in contiguous order.
4) During read modify write (RMW) operation, the memory fetching is reduced and the memory addressing is simplified since the read and write to memory are contiguous.

In the UMB system, the size of the codeword (i.e., length n) has a wide range, for example, from 128 bits to 20 k bits, and has a variable life span, for example, from 1 physical frame to 48 physical frames. Statically allocating space for a codeword in the LLR memory would imply allocating a maximum size for each codeword for the codeword lifespan which has the following drawbacks:

1) A codeword smaller than the maximum size is allocated extra space that is not utilized.
2) Chunks of codeword are received over multiple HARQ transmissions, and memory already allocated for portions of codewords that are not yet transmitted are not utilized.

In one aspect, statistical multiplexing by dynamically allocating memory on an as-needed basis is used to overcome the drawbacks mentioned above. Virtually partition (i.e., not physically partition) the LLR memory into nodes. Each codeword is assigned a certain number of nodes, and the LLRs of each codeword are stored in these nodes. Each codeword keeps track of these nodes via a link list. These nodes are assigned only on an as-needed basis, thus solving the above-mentioned drawbacks. The nodes can be allocated and de-allocated independently. In one example, the nodes are of equal size and their size is programmable. The nodes are initially placed in a free nodes link list.

Each codeword is associated with a unique link list, in which nodes are allocated on a need basis from the free nodes link list. Such a dynamic allocation allows an allocation of memory only when required, thus optimizing the memory utilization. At the end of the codeword's life span (e.g., due to user termination or successful decoding) the nodes allocated in the link list are returned to the free nodes link list.

Figure 6:
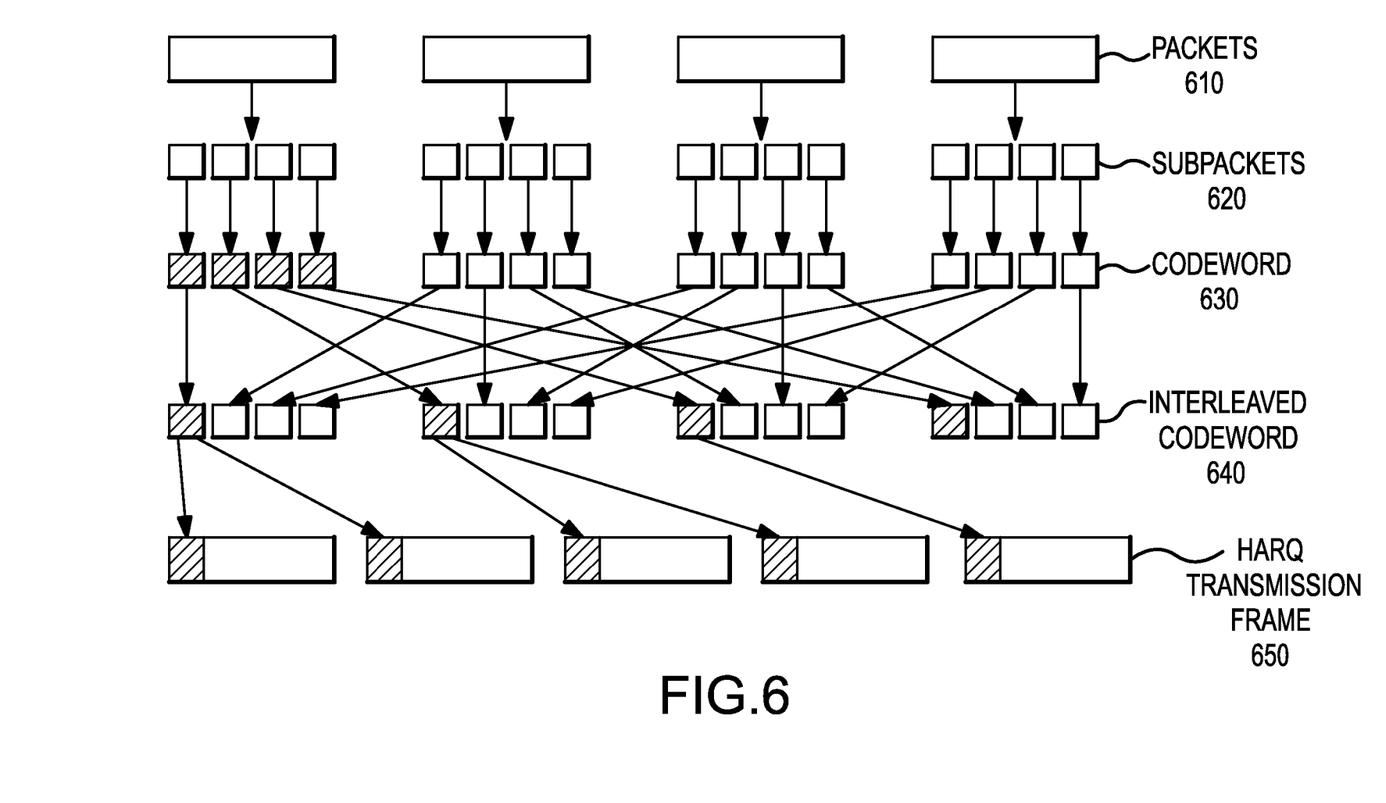
FIG. 6 illustrates an example transmission scheme in accordance with the present disclosure.

FIG. 6 illustrates an example transmission scheme in accordance with the present disclosure. Transmit packets 610 are first organized in the transmitter. Next, the packets are decomposed into subpackets 620. Each subpacket is sent to an encoder to produce codewords 630. The codewords 630 are next sent to an interleaver to provide resiliency against burst errors and to produce interleaved codewords 640. The interleaved codewords 640 are then decomposed further into smaller pieces and sent in separate HARQ transmission frames 650. Thus the received HARQ frames contain non-contiguous portions of the received codewords due to the interleaving and HARQ transmission format.

Figure 7:
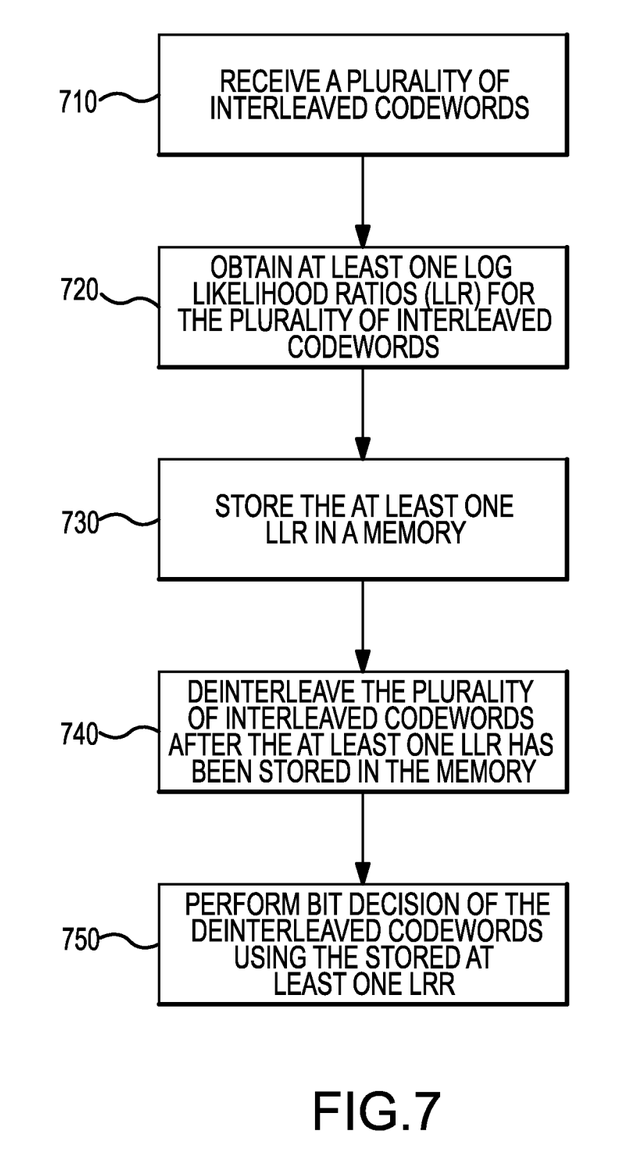
FIG. 7 illustrates an example flow diagram for storing log likelihood ratios (LLRs) in an interleaved form.

FIG. 7 illustrates an example flow diagram for storing log likelihood ratios (LLRs) in an interleaved form. In block 710, receive a plurality of interleaved codewords. In one aspect, following receiving the interleaved codewords, the plurality of interleaved codewords is demodulated. In one example, the demodulation is based on one of the following: binary phase shift keying (BPSK), quadrature phase shift keying (QPSK), multiple phase shift keying MPSK or quadrature amplitude modulation (QAM). In one aspect, the codewords are block codes, convolutional codes, turbo codes, or concatenated codes.

Following block 710, in block 720, obtain at least one log likelihood ratio (LLR) for the plurality of interleaved codewords. In one example, the at least one LLR is obtained after the plurality of interleaved codewords have been demodulated. In one aspect, in addition to using the interleaved codewords to obtain the at least one LLR an error model of the communication channel is also used. Modeling an error model using mathematical analysis, empirical measurements and/or simulation, etc. is known to one skilled in art. In one example, the error model models the bit errors due to the entire propagation path (i.e., starting from the transmitter though the communication channel transmission and to the receiver).

Following block 720, in block 730, store the at least one LLR in a memory. In one aspect, the memory is a component in a receiver that performs the storing step. In one example, the memory is a random access memory (RAM). Following block 730, in block 740, deinterleave the plurality of interleaved codewords after the at least one LLR has been stored in the memory. Following block 740, in block 750, perform bit decision of the deinterleaved codewords using the stored at least one LLR. In one example, the bit decision is a soft decision. In one aspect, performing the steps of the flow diagram of FIG. 7 reduces memory requirement.

In one aspect, a receiver performs one or more of the steps in blocks 710 through 750. In one example, the receiver for storing log likelihood ratios (LLRs) in an interleaved form comprises an antenna for receiving a plurality of interleaved codewords; a demodulator for obtaining at least one log likelihood ratio (LLR) for the plurality of interleaved codewords; a memory for storing the at least one LLR; a deinterleaver for deinterleaving the plurality of interleaved codewords after the at least one LLR has been stored in the memory; and a decoder for performing a bit decision of the deinterleaved codewords using the stored at least one LLR.

One skilled in the art would understand that the steps disclosed in the example flow diagram in FIG. 7 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 8:
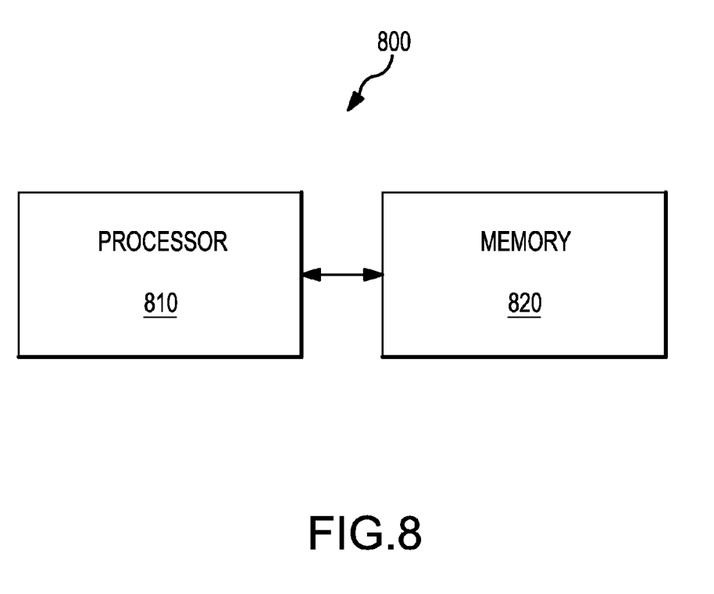
FIG. 8 illustrates an example of a device comprising a processor in communication with a memory for executing the processes for storing log likelihood ratios (LLRs) in an interleaved form.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 8 illustrates an example of a device 800 comprising a processor 810 in communication with a memory 820 for executing the processes for storing log likelihood ratios (LLRs) in an interleaved form. In one example, the device 800 is used to implement the algorithm illustrated in FIG. 7. In one aspect, the memory 820 is located within the processor 810. In another aspect, the memory 820 is external to the processor 810. In one aspect, the processor includes circuitry for implementing or performing the various flow diagrams, logical blocks and/or modules described herein.

Figure 9:
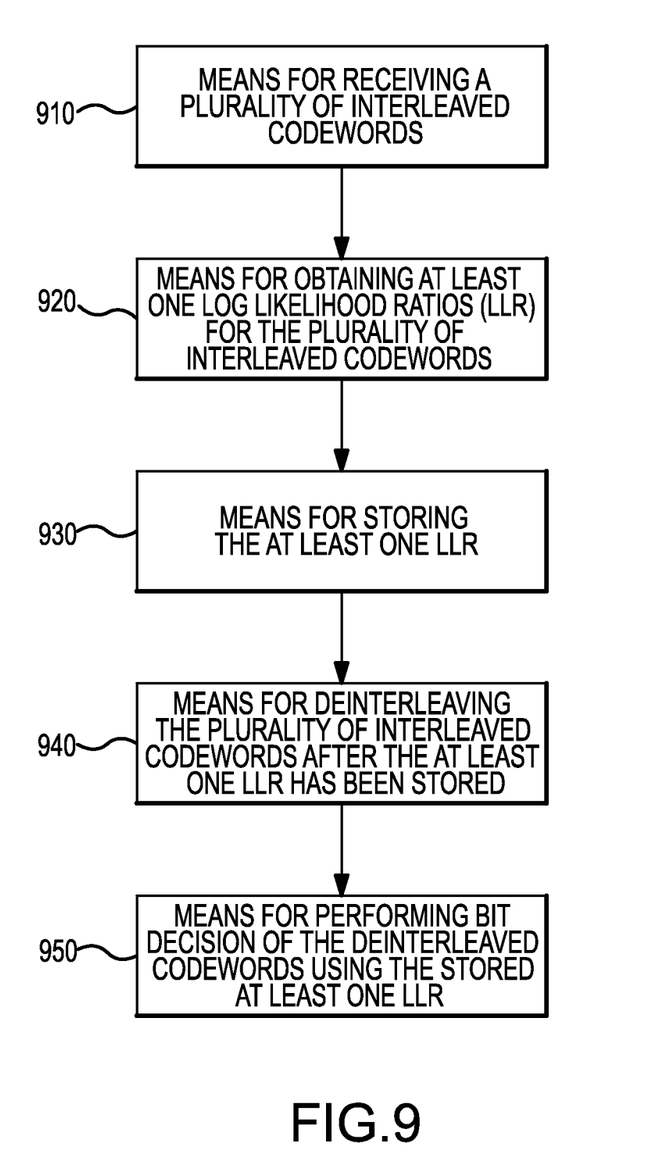
FIG. 9 illustrates an example of a device suitable for storing log likelihood ratios (LLRs) in an interleaved form.

FIG. 9 illustrates an example of a device 900 suitable for storing log likelihood ratios (LLRs) in an interleaved form. In one aspect, the device 900 is implemented by at least one processor comprising one or more modules configured for storing log likelihood ratios (LLRs) in an interleaved form as described herein in blocks 910, 920, 930, 940 and 950. For example, each module comprises hardware, firmware, software, or any combination thereof. In one aspect, the device 900 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for storing log likelihood ratios (LLR) in an interleaved form in memory to reduce memory requirements comprising:
receiving a plurality of interleaved codewords;
obtaining at least one LLR for the plurality of interleaved codewords;
storing the at least one LLR in a memory that is partitioned into a plurality of nodes,
wherein each of said interleaved codewords has associated therewith a unique link list in which at least one of said nodes has been dynamically allocated from a link list of free nodes, and wherein the at least one LLR is stored in the at least one node;
deinterleaving the plurality of interleaved codewords after the at least one LLR has been stored in the memory; and
performing through a decoder a bit decision of the deinterleaved codewords using the stored at least one LLR.

2. The method of claim 1 further comprising demodulating the plurality of interleaved codewords.

3. The method of claim 2 wherein the demodulating step is based on one of the following: binary phase shift keying (BPSK), quadrature phase shift keying (QPSK), multiple phase shift keying MPSK or quadrature amplitude modulation (QAM).

4. The method of claim 3 further comprising using an error model of a communication channel to obtain the at least one LLR.

5. The method of claim 4 wherein the error model is based on at least one of the following: mathematical analysis, empirical measurements or simulation.

6. The method of claim 1 wherein the memory is a component in a receiver that performs the storing step.

7. The method of claim 6 wherein the memory is a random access memory (RAM).

8. The method of claim 1 wherein the bit decision is a soft decision.

9. The method of claim 1, wherein each of said nodes is configured to be allocated and de-allocated independently.

10. A receiver for storing log likelihood ratios (LLRs) in an interleaved form in memory to reduce memory requirements comprising:
an antenna for receiving a plurality of interleaved codewords;
a demodulator for obtaining at least one LLR for one of the plurality of interleaved codewords;
a memory for storing the at least one LLR wherein said memory is partitioned into a plurality of nodes, wherein each of said interleaved codewords has associated therewith a unique link list in which at least one of said nodes has been dynamically allocated from a link list of free nodes, and where the at least one LLR is stored in the at least one node;

a deinterleaver for deinterleaving the plurality of interleaved codewords after the at least one LLR has been stored in the memory; and a decoder for performing a bit decision of the deinterleaved codewords using the stored at least one LLR.

11. The receiver of claim 10 wherein the demodulator further demodulates the plurality of interleaved codewords.

12. The receiver of claim 11 wherein the demodulating process is based on one of the following: binary phase shift keying (BPSK), quadrature phase shift keying (QPSK), multiple phase shift keying MPSK or quadrature amplitude modulation (QAM).

13. The receiver of claim 10 wherein the demodulator further uses an error model of a communication channel to obtain the at least one LLR.

14. The receiver of claim 13 wherein the error model is based on at least one of the following: mathematical analysis, empirical measurements or simulation.

15. The receiver of claim 10 wherein the memory is a random access memory (RAM).

16. The receiver of claim 15 wherein the bit decision is a soft decision.

17. The receiver of claim 10 wherein the bit decision is a soft decision.

18. The apparatus of claim 10, wherein each of said nodes is configured to be allocated and de-allocated independently.

19. An apparatus for storing log likelihood ratios (LLRs) in an interleaved form in memory to reduce memory requirements comprising:
means for receiving a plurality of interleaved codewords;
means for obtaining at least one LLR for the plurality of interleaved codewords;
means for portioning a memory into a plurality of nodes for storing LLRs wherein each of said interleaved codewords has associated therewith a unique link list in which at least one of said nodes has been dynamically allocated from a link list of free nodes, and wherein the at least one LLR is stored in the at least one node;
means for deinterleaving the plurality of interleaved codewords after the at least one LLR has been stored; and
means for performing through a decoder a bit decision of the deinterleaved codewords using the stored at least one LLR.

20. The apparatus of claim 19 further comprising means for demodulating the plurality of interleaved codewords.

21. The apparatus of claim 20 wherein the demodulating is based on one of the following: binary phase shift keying (BPSK), quadrature phase shift keying (QPSK), multiple phase shift keying MPSK or quadrature amplitude modulation (QAM).

22. The apparatus of claim 19 further comprising means for using an error model of a communication channel to obtain the at least one LLR.

23. The apparatus of claim 22 wherein the error model is based on at least one of the following: mathematical analysis, empirical measurements or simulation.

24. The apparatus of claim 19 wherein the bit decision is a soft decision.

25. The apparatus of claim 19, wherein each of said nodes is configured to be allocated and de-allocated independently.

26. A non-transitory computer-readable medium including program code stored thereon, comprising:

program code for receiving a plurality of interleaved form codewords;

program code for obtaining at least one log likelihood ratio (LLR) for the plurality of interleaved codewords;

program code for storing the at least one LLR in a memory that is portioned into a plurality of nodes, where each of said interleaved codewords has associated therewith a unique link list in which at least one of said nodes has been dynamically allocated from a link list of free nodes and where the at least one LLR is stored in the at least one node;

program code for deinterleaving the plurality of interleaved codewords after the at least one LLR has been stored; and program code for performing through a decoder a bit decision of the deinterleaved codewords using the stored at least one LLR.

27. The non-transitory computer-readable medium of claim 26 further comprising program code for demodulating the plurality of interleaved codewords.

28. The non-transitory computer-readable medium of claim 27 wherein the program code for demodulating is based on one of the following: binary phase shift keying (BPSK), quadrature phase shift keying (QPSK), multiple phase shift keying MPSK or quadrature amplitude modulation (QAM).

29. The non-transitory computer-readable medium of claim 26 further comprising program code for using an error model of a communication channel to obtain the at least one LLR.

30. The non-transitory computer-readable medium of claim 29 wherein the error model is based on at least one of the following: mathematical analysis, empirical measurements or simulation.

31. The non-transitory computer-readable medium of claim 26 wherein the bit decision is a soft decision.

32. The non-transitory computer-readable medium of claim 26, wherein each of said nodes is configured to be allocated and de-allocated independently.

33. A method for storing log likelihood ratios in an interleaved form in memory to reduce memory requirements comprising:
receiving a plurality of interleaved codewords;
obtaining at least one log likelihood ratio (LLR) for the plurality of interleaved form codewords;
storing the at least one LLR of the plurality of interleaved form codewords in a memory and assuming LLRs to be equal to zero for one or more codewords not yet transmitted and zeroing out the LLR values for locations of the memory corresponding to the one or more codewords not yet transmitted;
deinterleaving the plurality of interleaved codewords after the at least one LLR has been stored in the memory, including performing a zero padding operation by passing on lengths of the LLRs as a parameter for the received plurality of interleaved codewords to account for those LLRs that are assumed to be zero; and
performing through a decoder a bit decision of the deinterleaved codewords using the stored at least one LLR.

34. An apparatus for storing log likelihood ratios in an interleaved form in memory to reduce memory requirements, the apparatus comprising:
an antenna for receiving a plurality of interleaved codewords;
a demodulator for obtaining at least one log likelihood ratio (LLR) for the plurality of interleaved codewords;
a memory for storing the at least one LLR of the plurality of interleaved form codewords and wherein LLRs are assumed to be equal to zero for one or more codewords not yet transmitted and zeroing out the LLR values for locations of the memory corresponding to the one or more codewords not yet transmitted;

a deinterleaver for deinterleaving the plurality of interleaved codewords after the at least one LLR has been stored in the memory, wherein said deinterleaver is further for performing a zero padding operation by passing on lengths of the LLRs as a parameter for the received plurality of interleaved codewords to account for those LLRs that are assumed to be zero; and a decoder for performing a bit decision of the deinterleaved codewords using the stored at least one LLR.

* * * * *